United States Patent [19]

Fox et al.

[11] Patent Number: 5,636,216

[45] Date of Patent: Jun. 3, 1997

[54] METHOD FOR TRANSLATING INTERNET PROTOCOL ADDRESSES TO OTHER DISTRIBUTED NETWORK ADDRESSING SCHEMES

[75] Inventors: Richard H. Fox, Sunnyvale; Brett D. Galloway, Campbell, both of Calif.

[73] Assignee: Metricom, Inc., Los Gatos, Calif.

[21] Appl. No.: 225,212

[22] Filed: Apr. 8, 1994

(Under 37 CFR 1.47)

[51] Int. Cl.$^6$ .................. H04L 12/407; H04J 3/02
[52] U.S. Cl. ................................................ 370/402
[58] Field of Search .............. 370/85.13, 85.12, 370/94.1, 94.3, 60, 85.14, 60.1, 94.2, 85.1; 340/825.52; 395/280

[56] References Cited

U.S. PATENT DOCUMENTS

| | | | |
|---|---|---|---|
| 4,939,726 | 7/1990 | Flammer et al. | 370/94.1 |
| 5,115,433 | 5/1992 | Baran et al. | 370/94.3 |
| 5,442,633 | 8/1995 | Perkins et al. | 370/94.1 |
| 5,444,702 | 8/1995 | Burnett et al. | 370/60.1 |

*Primary Examiner*—Wellington Chin
*Assistant Examiner*—Melissa Kay Carman
*Attorney, Agent, or Firm*—Townsend and Townsend and Crew

[57] ABSTRACT

In a local network connected to other networks which employ an Internet Protocol, and wherein the local network includes nodes which cannot monitor all other nodes in the local network, an Internet Protocol address of a target node in the local network is translated at a gateway node in the local network to a network-specific local address of the target node without the use of broadcasting. The network specific local address of the target node is the address which is usable within the local network for forwarding a packet to the target node.

14 Claims, 6 Drawing Sheets

METHOD FOR TRANSLATING INTERNET PROTOCOL ADDRESSES TO OTHER DISTRIBUTED NETWORK ADDRESSING SCHEMES

BACKGROUND OF THE INVENTION

This invention relates generally to a method for translating addresses between the addressing scheme determined by the Internet Protocol and another addressing scheme used by a data communication network.

The Internet Protocol is a widely used protocol for the transmission of data communication packets over a network of participating digital communication networks. The operation of the Internet Protocol is described in detail in Stallings, *Handbook of Communication Standards* vol. 3 (1990), a generally-available reference in the field, the contents of which are herein incorporated by reference. One example of a network of networks which operates according to the Internet Protocol is the Internet, a global network of networks which operates with decentralized management. Herein, all interconnected networks of networks which operate according to the Internet Protocol are referred to as internets.

Figure 1:
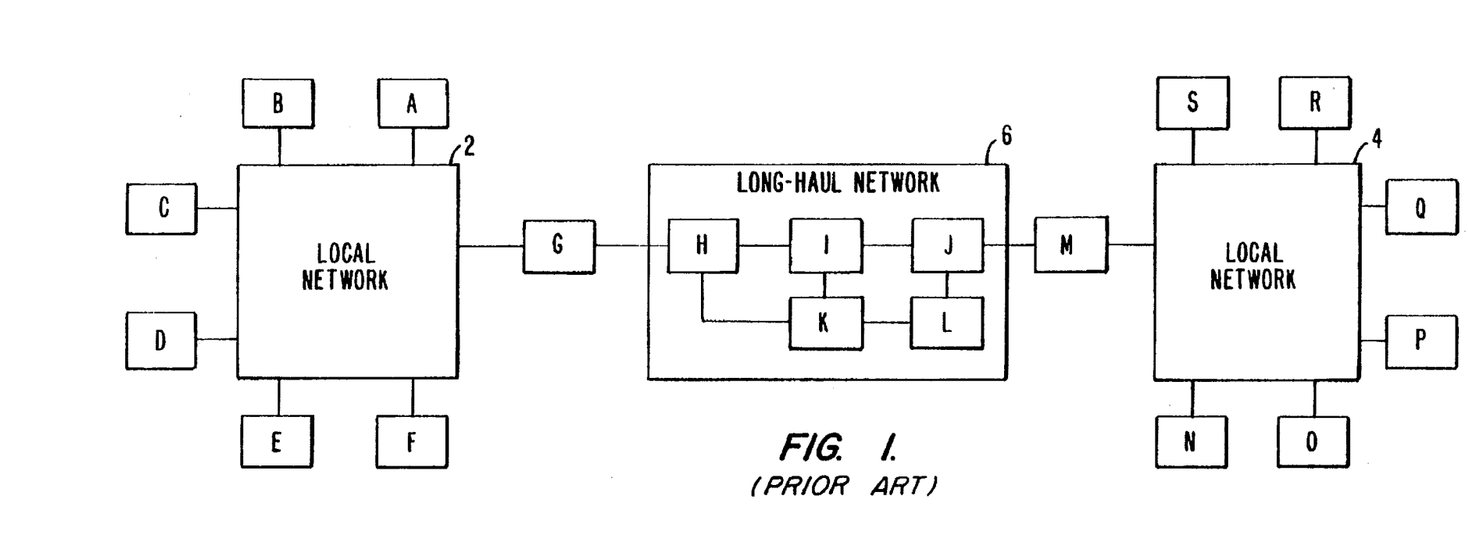
FIG. 1 is a block diagram illustrating an internet of the prior art.

FIG. 1 depicts an exemplary internet which comprises a first local area network (LAN) 2, a second LAN 4 and a long haul network 6 which allows for packets to be communicated between the LANs. Host nodes A through F and gateway node G are connected to LAN 2. Host nodes H through L and gateway node M are connected to LAN 4. Each host node and gateway node possesses a unique local network address known as a Medium Access Controller (MAC) address. The MAC address is uniquely assigned to each node and does not depend on the identity of the network to which the node is connected. LANs 2 and 4 are not limited to any specific topology but operate to allow a data communication packet to be forwarded from a source node connected to the network to any target node connected to the network provided that the MAC address of the target node is included in a header of the packet.

Long haul network 6 comprises routers H, I, J, K, and L and is also connected to gateway nodes G and M to permit packets to be communicated between LANs 2 and 4. Each node connected to LANs 2 and 4 has in addition to its MAC address a uniquely assigned Internet Protocol (IP) address which identifies the node and the network to which the node is connected. Typically, each node is aware of its own IP address and MAC address.

The internet depicted in FIG. 1 is intended to illustrate the basic architecture of an internet. An actual internet may serve to interconnect many more than two networks. Furthermore, the networks interconnected by an internet need not be LANs but may be wide area networks (WANs) or have other topologies such as mesh, ring etc.

Using the Internet Protocol, a source node connected to LAN 2 may transmit a data communication packet to a target node connected to LAN 4. Transmission of a data packet according to the Internet Protocol from source node A connected to LAN 2 to target node N connected to LAN 4 proceeds as follows. Source node A includes the IP address of target node N in a header of the packet. The packet is then transmitted over LAN 2 to gateway node G and from there it is relayed over long haul network 6 following a linked path consisting of routers, H, I, and J, eventually arriving at gateway node M connected to LAN 4. The path taken by the packet through long haul network 6 is not necessarily predetermined but rather each router may select a successor router upon receipt of the packet. The selection of successor router is made based on the IP address of the target node, network connectivity information of which the router is aware, and other parameters such as network traffic and the priority of the packet.

The packet must then be forwarded from gateway node M to target node N. Typically, the operation of an LAN requires that packets transmitted over the LAN be addressed using the MAC address and not the IP address of the target node. However, the Internet Protocol does not require that the MAC address be included in a header of the packet when it is received at gateway node M, which as herein explained can present problems.

The gateway node M may already be aware of the MAC address of host node N and may then forward the packet to host node N using the MAC address. If the gateway node M is unaware of the MAC address of the host node N it typically determines the MAC address by a method known as the Address Resolution Protocol (ARP). The ARP exploits the broadcast property of an LAN: namely, that a transmission from any node on the network is received by all other nodes on the network.

The gateway node M thus determines the MAC address of the target node N using the ARP as follows. The gateway node M broadcasts over the LAN 4 an inquiry message containing the IP address of the target node N. The target node N then responds with a reply message containing as a matched pair both its own MAC address and its own IP address. The gateway node M stores the paired MAC address and IP address in a local routing table at the gateway node M. The packet may then be forwarded to the target node N by including the MAC address in a header of the packet. Packets received at the gateway node and addressed to the IP address of the target node are henceforth forwarded using the MAC address stored in the local routing table at the gateway node.

The ARP thus allows a packet forwarded over an internet and received at a gateway node connected to a local network to be forwarded to the target node to which the packet is directed. However, only networks with certain properties may effectively use the ARP. For example, the network should have the broadcast property typically associated with LANs, that is, the network must be physically configured so that each node can directly receive an inquiry message broadcast over the network. If one or more nodes within the LAN cannot directly receive an inquiry message, further relaying of the inquiry message will be required at an increased expense in network resources. Frequent ARP inquiry messages will therefore reduce network efficiency. Larger network operation can be substantially impaired by the ARP inquiry messages.

If the network lacks the broadcast property of LANs and ARP inquiry messages may only be broadcast at high cost, the resulting network inefficiency is further compounded when the network composition is unstable and a large fraction of the nodes on the network have recently been connected. In this situation, a gateway node receiving a packet for relay to a target node connected to the network will very often lack the MAC address of the target node and will be forced to broadcast an ARP inquiry message to determine the MAC address. The expensive ARP inquiry messages will therefore be frequent and network efficiency will be substantially impaired.

Moreover, a recently connected target node will often be unaware of its own IP address, since the IP address in part depends on the identity of the participating network to which the node is connected. The target node may at different times connect and disconnect to various networks and therefore lack a stable IP address. Such a target node will be unable to reply to an ARP broadcast because it will not recognize a particular IP address as being its own.

A network which is a wireless data communication network is exemplary of networks which cannot effectively forward packets received over an internet by using the ARP to translate IP addresses to local network addresses. In such networks, nodes often cannot communicate with one another directly, and packets are typically transmitted via a series of intermediate nodes. The broadcast of an ARP inquiry message to all the nodes in the network is therefore prohibitively expensive, since it would require that an inquiry packet be relayed to each node connected to the wireless network.

The expense of broadcasting is further compounded if the wireless network consists all or in part of mobile nodes. Mobile nodes may be connected to a particular network for only a short period of time. A gateway node on a wireless network is likely to be unaware of the MAC address associated with a target node to which a packet received at the gateway node is addressed. Therefore, expensive ARP inquiry messages are likely to be very frequent. Furthermore, a mobile node may be unaware of its own IP address and thus be unable to respond to an ARP inquiry message.

A further difficulty arises in networks which use certain geographical routing methods for forwarding packets. A geographical routing method is disclosed in U.S. Pat. No. 4,939,726, which is herein incorporated by reference. In a network which makes use of the therein disclosed geographic routing method, a packet is typically forwarded from a source node to a target node via a series of intermediate nodes. The address of the target node is included in a header of the packet. The disclosed method requires that packet addresses incorporate the geographic coordinates of the target node. Each intermediate node typically selects a successor intermediate node based on the maximum forward progress attainable using the least amount of power. Forward progress is determined by calculating a metric incorporating the geographical distance between the geographic coordinates of the target node and the geographic coordinates of each node to be evaluated for selection as a successor intermediate node. The geographic coordinates of the target node are derived from the address of the target node found in the header of the packet. Thus, retrieving the MAC address of the target node, as is accomplished by the ARP, will be insufficient to relay a packet to the target node over such a network, because the MAC address does not contain any information about the geographic coordinates of the target node.

Another difficulty arises when storage at the gateway node is limited so that only a restricted number of pairings of IP addresses and network specific local addresses is retained. If the ARP method for translation is used, repeated broadcasts may be necessary as pairings are lost or overwritten.

It is desirable to send packets from a source node connected to an originating network which participates in an internet to a target node connected to a destination network which participates in the same internet where the characteristics of the destination network preclude effective use of the ARP. What is needed is a method for translating an IP address to a local network address that does not require broadcasting as a step in translation and can accommodate nodes that have recently connected to the network and require IP address assignments.

It is also desirable to send packets from a source node connected to an originating network which participates in an internet to a target node connected to a destination network which participates in the same internet and cannot use a MAC address to forward packets from a gateway node on the destination network to the target node. What is needed is a method for translating an IP address to a network specific local address which may be used to forward packets from a gateway node to a target node over a destination network which cannot use MAC addresses for forwarding packets. For example, a translation method is needed which given the IP address of a target node provides a network specific local address which incorporates the geographic coordinates of the target node.

Furthermore, it is desirable to have ample remote storage of pairings between IP address and network specific local addresses which may be accessed by any node connected to a network which participates in an internet. What is needed is a remote address server which can store pairings of IP addresses and network specific local addresses and can respond to requests forwarded over an internet for translation of IP addresses to network specific local addresses.

SUMMARY OF THE INVENTION

According to the invention, in a local network connected to other networks which employ an Internet Protocol and wherein the local network includes nodes which cannot monitor all other nodes connected to the local network, an Internet Protocol address of a target node connected to the local network is translated at a gateway node to a network specific local address of the target node without the use of broadcasting. The network specific local address of the target node is the address which is usable within the local network for forwarding a packet to the target node.

According to a first aspect of the invention, the translation at the gateway node is accomplished by consulting a record stored at the gateway node which contains both the network specific local address and IP address of the target node. In one scheme, this record is created by self-registration. The target node self-registers by contacting the gateway node and sending the gateway node the target's own IP address and network specific local address.

Alternatively, the record stored at the gateway node is created by assignment. Under this scheme, the target node contacts the gateway node and sends to the gateway node its own network specific local address. The gateway node then assigns the target node an IP address. Under either scheme, a record is stored at the gateway node which can later be used for translation.

A second aspect of the invention takes advantage of the collection function employed by a remote address server. The remote address server which is typically not on the local network, but which is in communication with the gateway node over an internet, captures network specific local address and IP address information about nodes of which it becomes aware. For each node of which the remote address server becomes aware it creates a record containing the network specific local address and IP address of the node. For example, a reporting node may employ an internet to self-register by reporting its own network specific local address and IP address to the remote address server. Alternatively, an operator may enter the IP address and network specific local address of a node into the remote address server.

According to the second aspect of the invention, the translation at the gateway node is alternatively accomplished by consulting a record stored at the remote address server containing the network specific local address and IP address of the target node. The gateway node accesses the record by formulating an inquiry message which includes the IP address of the target node and then by forwarding the message to the remote address server over the internet to which they are both connected. The remote address server consults the record to determine the corresponding network specific local address and then includes the network specific local address in a reply message which is forwarded to the gateway node. Thus, according to the second aspect of the invention, translation is accomplished using minimal storage at the gateway node.

According to a third aspect of the invention, by taking advantage of the translation feature at the gateway node, a packet may be forwarded from a source node connected to an originating network to a target node connected to a destination network. The IP address of the target node is included in a header of the packet. In accordance with the Internet Protocol, the packet is then forwarded to a gateway node which is connected to the destination network. The gateway node translates the IP address of the packet to the network specific local address by use of the inventive method. The packet is then forwarded to the target node using the network specific local address.

In one embodiment of the invention, the network specific local address of the target node to which an IP address is translated incorporates the geographic coordinates of the target node. The geographic address obtained at the gateway node by use of the translation feature may be used to forward a packet to the target node by employing a geographic routing method as is disclosed in U.S. Patent No. 4,939,726.

The invention will be better understood by reference to the following detailed description in connection with the accompanying drawings.

DESCRIPTION OF SPECIFIC EMBODIMENTS

Figure 2:
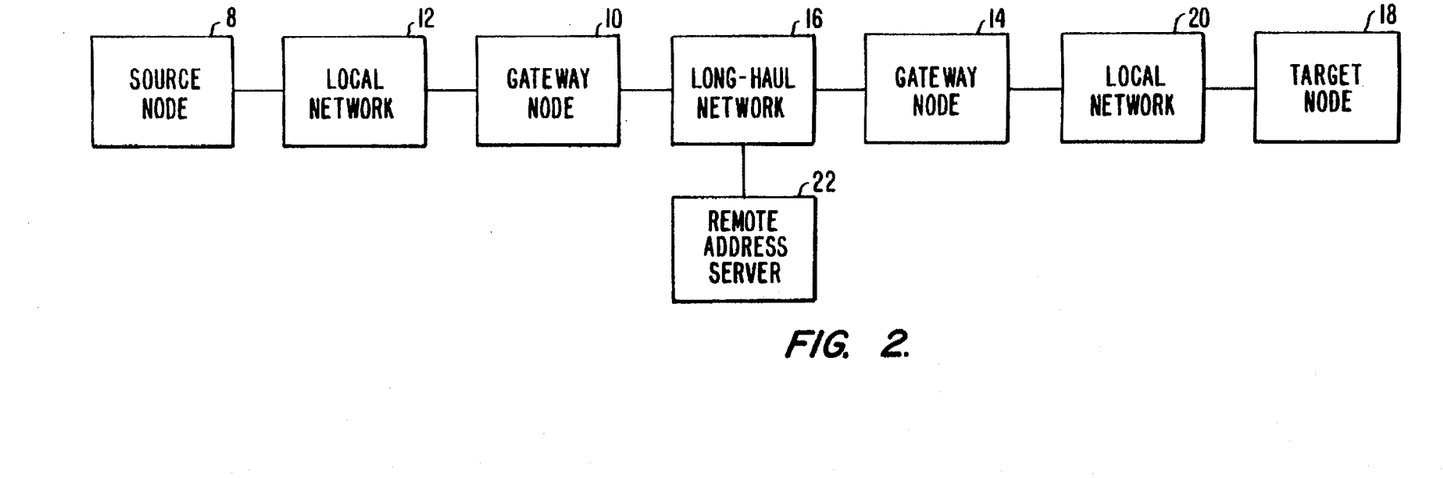
FIG. 2 is a block diagram illustrating an internet which operates according to the invention.

FIG. 2 depicts an internet which may take advantage of the address translation method of the invention. Source node 8 and gateway node 10 are connected to local network 12. Gateway nodes 10, 14 are connected to long haul network 16. Gateway node 14 and target node 18 are connected to local network 20. In accordance with the invention, a remote address server 22 is accessible via the internet and is connected to long haul network 16.

Figure 3:
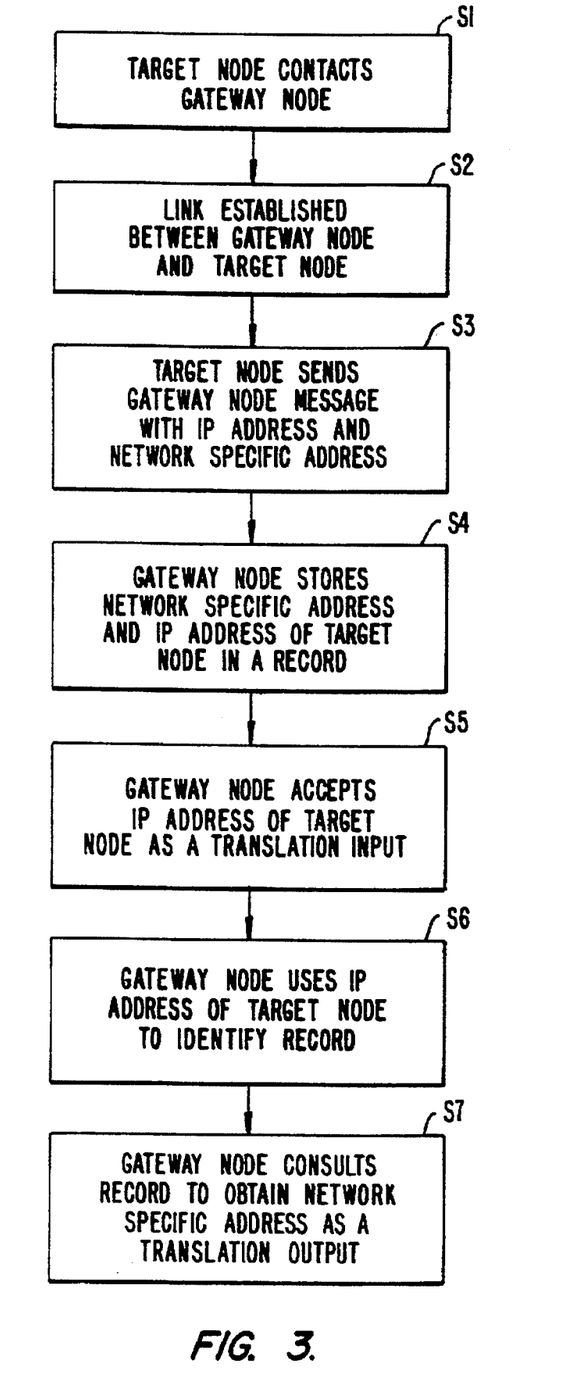
FIG. 3 is a flow chart describing steps of an address translation method according to the invention.

FIG. 3 is a flow chart illustrating steps of an address translation method in accordance with the invention. A record for address translation is created by self-registration. Target node 18 is aware of its own IP address and its own network specific local address usable for forwarding a packet over local network 20. The network specific local address need not be a MAC address and may incorporate the geographic coordinates of the target node. Gateway node 14 is contacted by target node 16 (Step S1). A data communication link is established between gateway node 14 and target node 18 which permits data communication between the nodes (Step S2).

Target node 18 then transmits a message to gateway node 14 over the link which includes the IP address and network specific local address of target node 18 (S3). The IP address and network specific local address are stored as a record in a memory device at gateway node 14 (S4). In one embodiment, Gateway node 14 may thereafter translate from the IP address of the target node to the network specific local address of target node 18 by consulting the record. To translate, gateway node 14 accepts the IP address of the target node as a translation input (S5). The translation input may originate with operator entry at the gateway node or from software operating at the gateway node which requires a translation of the IP address. As will be discussed below in connection with FIG. 5, an IP address to be translated may also be extracted from a packet received at the gateway node for forwarding to the target node.

Gateway node 14 uses the IP address of target node 18 accepted as translation input to identify the previously stored record (S6). Gateway node 14 then consults the record to obtain the network specific local address of target node 18 (S7). The network specific local address of target node 18 is then the translation output.

Figure 4:
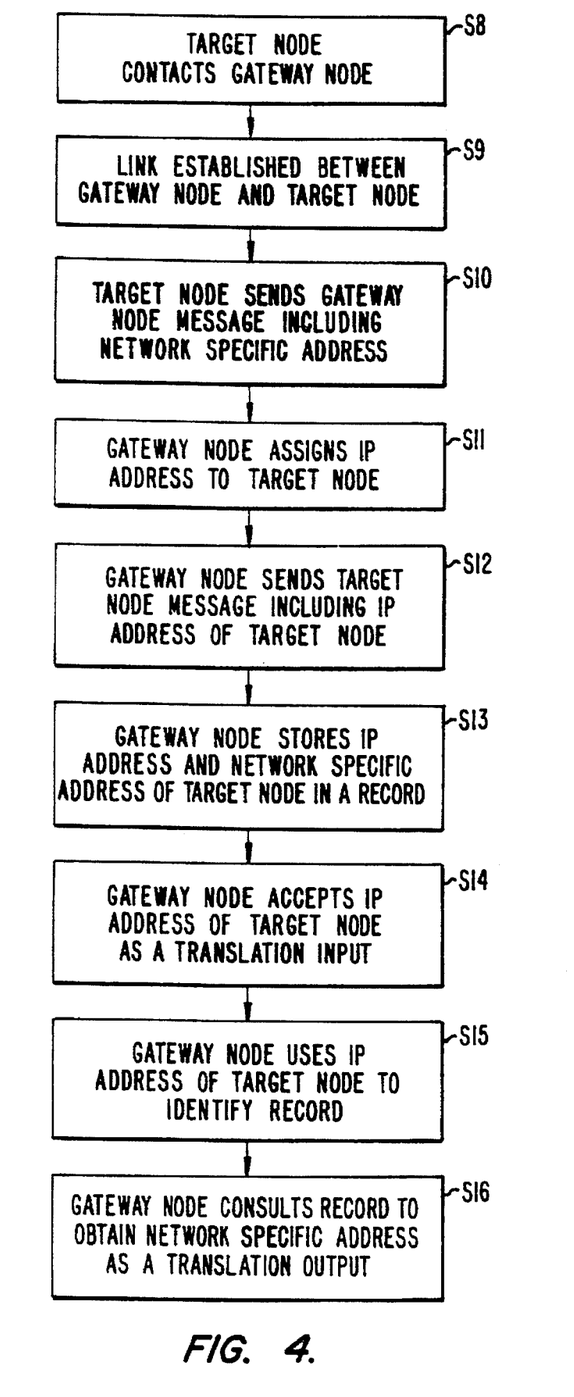
FIG. 4 is a flow chart describing steps of an address assignment and translation method according to the invention.

FIG. 4 is a flow chart illustrating steps of an alternative address translation method according to the invention. By use of this method, a node which lacks an IP address may obtain one. Simultaneously, a record for address translation is created by self registration.

In the alternative method, target node 18 has a network specific local address usable for forwarding packets over local network 20 and is aware of its own network specific local address but lacks an IP address. Target node 18 contacts gateway node 14 (S8). A link is established between gateway node 14 and target node 18 (S9). Target node 18 sends gateway node 14 a message including its own network specific local address over the link (S10).

Gateway node 14 then assigns target node 18 an IP address (S11). This assignment may be accomplished using the "bootp" program, a widely-used IP address assignment program. Gateway node 14 forwards a message including the IP address to target node 18 (S12) and stores the IP address and network specific local address as a record in a memory device at gateway node 14 (S13). Target node 18 thus now has an IP address of which it is aware. Gateway node 14 translates from the IP address of target node 18 to the network specific local address of target node 18 in the same way discussed in connection with FIG. 3 (S14–16).

Figure 5:
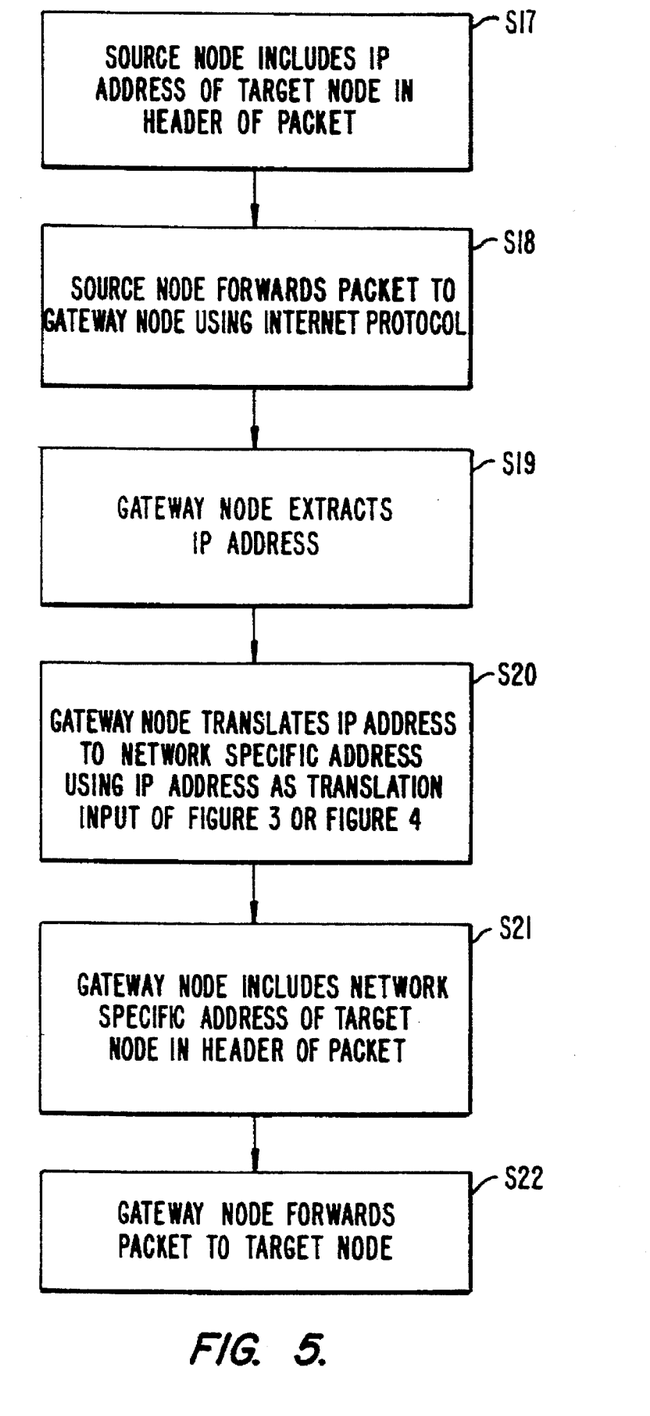
FIG. 5 is a flow chart describing how a packet may be forwarded via an internet according to the invention.

FIG. 5 is a flowchart illustrating steps of a packet forwarding method according to the invention. By this method, a packet may be forwarded from source node 8, connected to originating local network 12, to target node 18 connected to destination local network 20. A record containing the network specific local address and IP address of target node 18 is created and stored at gateway node 14 according to one of the inventive address translation methods depicted in FIGS. 3 and 4.

The packet forwarding method of the invention takes advantage of the method specified by the Internet Protocol for forwarding packets over an internet. Source node 8 includes the IP address of target node 18 in a header of the packet to be communicated (S17). Source node 8 then forwards the packet to gateway node 14 through local network 12, gateway node 10 and long-haul network 16 employing the method specified by the Internet Protocol (S18).

In accordance with the invention, upon receipt of the packet at gateway node 14, gateway node 14 extracts the IP address from the packet (S19). Gateway node 14 then translates the IP address of target node 18 to the network specific local address usable for forwarding packets over local network 20 (S20). The translation is accomplished by using the extracted IP address of the target node as the translation input of either of the inventive methods depicted in FIGS. 3 and 4.

Gateway node 14 then includes the network specific local address of target node 18 obtained by translation in a header of the packet (S21). Finally, the packet is forwarded to target node 18 using the network specific local address (S22). If the network specific local address incorporates the geographic coordinates of target node 18, the packet may be forwarded from gateway node 14 to target node 18 according to the geographic routing method disclosed in U.S. Pat. No. 4,939,726.

Figure 6:
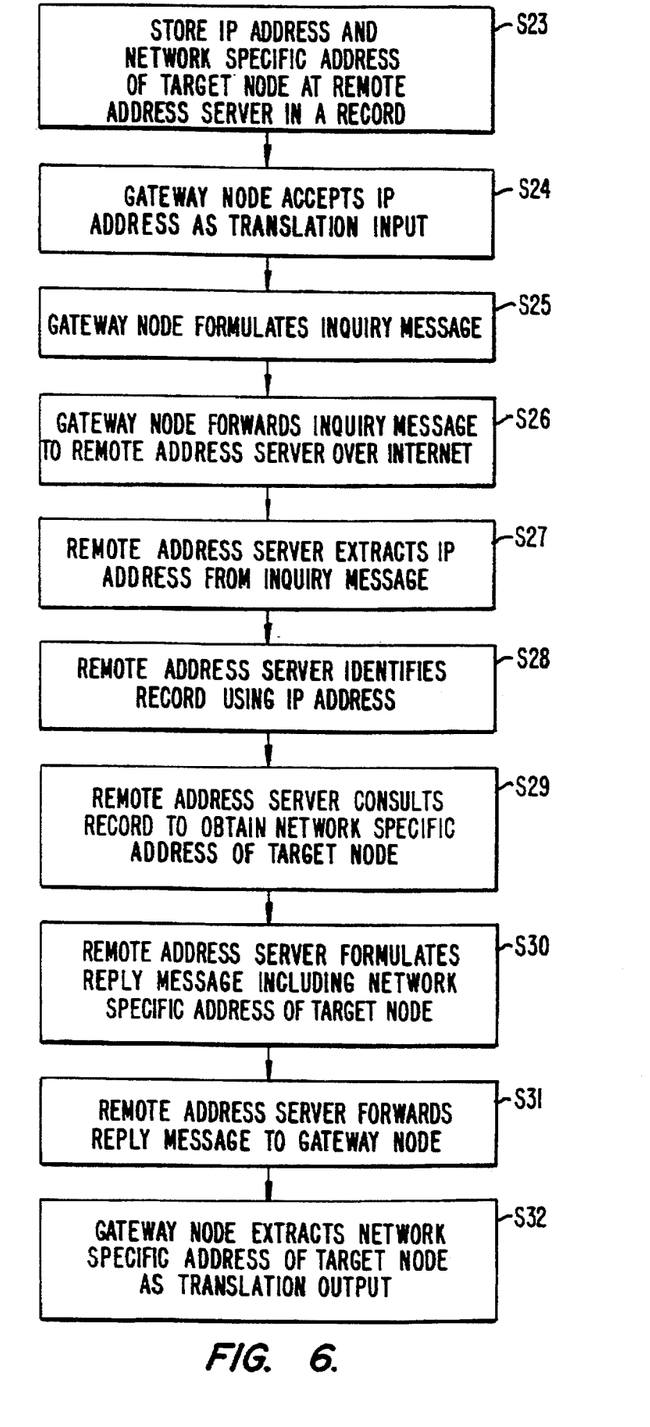
FIG. 6 is a flow chart describing steps of an address translation method employing a remote address server according to the invention.

FIG. 6 is a flowchart describing the steps of a remote address translation method employing a remote address server which is accessible via an internet. The inventive remote address translation method takes advantage of the collection function employed by remote address server 22. For each node of which remote address server 22 becomes aware the server creates a record containing the network specific local address and IP address of the node. For example, target node 18 may self-register by sending a self-registration message to remote address server 22 through local network 20, gateway node 14, and long haul network 16. Alternatively, an operator may enter the IP address and network specific local address of target node 18 into an input device at remote address server 22.

In accordance with the inventive remote address translation method, a record which includes the collected IP address and network specific local address of a target node is stored in a memory device at remote address server 22 (S23). The network specific local address is usable for forwarding a packet to target node 18 over local network 20 and may incorporate the geographic coordinates of the target node.

Gateway node 14 accepts the IP address of target node 18 as translation input (S24). The translation input may originate with operator entry at the gateway node, from software operating at the gateway node which requires a translation of the IP address or from a packet received at the gateway node for forwarding to the target node. Gateway node 14 formulates an inquiry message which includes the IP address of target node 18 accepted as translation input (S25). Gateway node 14 then forwards this message over long-haul network 16 to remote address server 22 (S26).

Remote address server 22 receives the inquiry message and extracts the IP address of target node 18 from the message (S27). Remote address server 22 uses the extracted IP address of the target node to identify the previously stored record (S28). Remote address server 22 then consults the record to obtain the network specific local address of the target node (S29) and formulates a reply message which includes the network specific local address of target node 18 (S30). The reply message is then forwarded to gateway node 14 over long-haul network 16 (S31). Gateway node 14 extracts the network specific local address from the reply message (S32) and the extracted network specific local address is the translation output.

Figure 7:
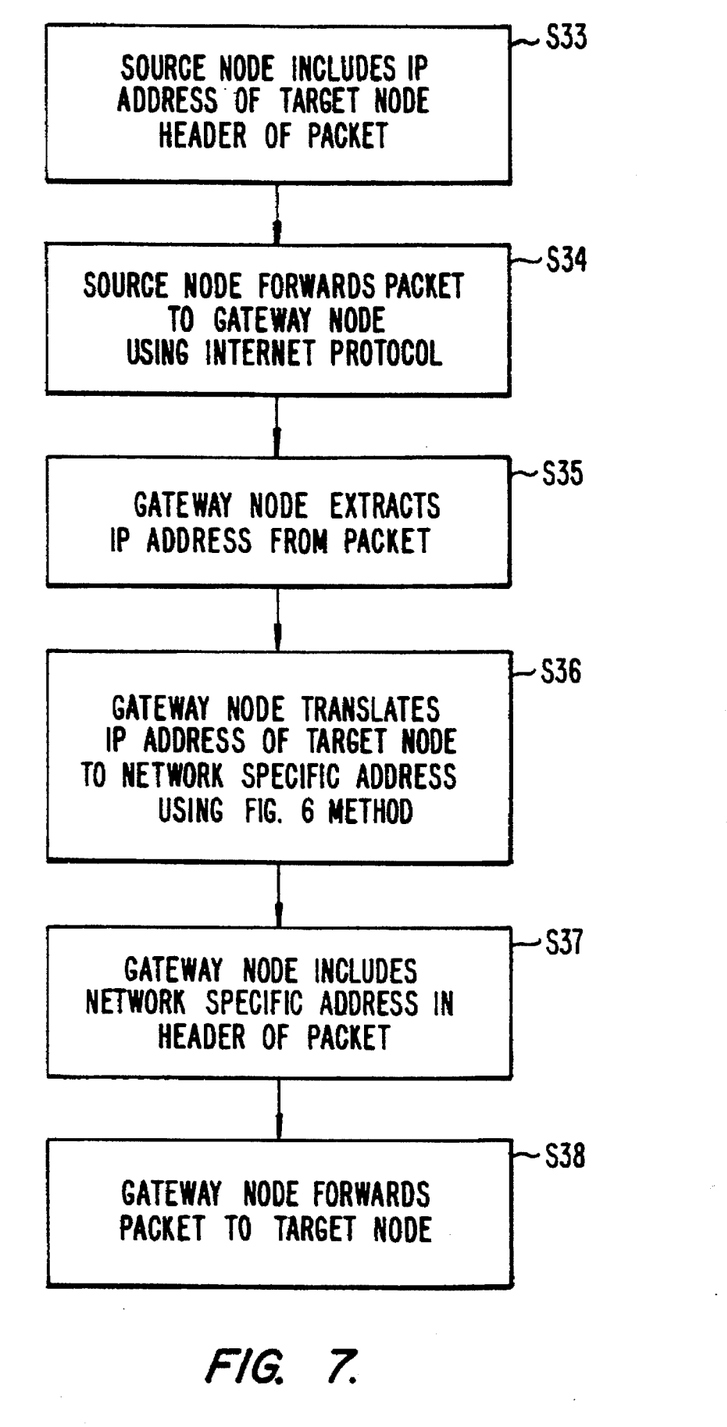
FIG. 7 is a flow chart describing steps of a packet forwarding method employing a remote address server according to the invention.

FIG. 7 illustrates the steps of a packet forwarding method which makes use of the remote address translation method described in FIG. 6. By this method, a packet may be forwarded from source node 8, connected to originating local network 12, to target node 18, connected to destination local network 20.

According to the inventive method, source node 8 includes the IP address of target node 18 in a header of the packet to be communicated (S33). Source node 8 then forwards the packet to gateway node 14 using the method specified by the Internet Protocol (S34).

In accordance with the invention, upon receipt of the packet at gateway node 14, gateway node 14 extracts the IP address from the packet (S35). To obtain the network specific local address of target node 18, gateway node 10 accesses remote address server 22 according to the method described in FIG. 6 (S36) using the extracted IP address as the translation input. Gateway node 14 then includes the network specific local address in a header of the packet (S37) and forwards the packet to target node 18 over local destination network 18 (S38).

If the network specific local address incorporates the geographic coordinates of the target node, the packet may be forwarded from the gateway node to the target node according to the geographic routing method disclosed in U.S. Pat. No. 4,939,726.

In an embodiment of the invention which combines the packet forwarding methods of FIGS. 4 and 6, the gateway node first attempts to translate the IP address of the target node by the method described in FIG. 4, that is by consulting a record of the network specific local address stored at the gateway node. If no such record may be identified, then translation is accomplished by the method described in FIG. 6, that is by consulting a remote address server.

A record which includes the needed network specific local address may not be identified at the gateway node for a variety of reasons. The gateway node may be newly connected to the network or the target node may have never self-registered at the gateway node. Also, the gateway node may have limited storage resources and therefore may have previously overwritten the needed record.

The invention has now been explained with reference to specific embodiments. Other embodiments will be apparent to those of ordinary skill in the art in view of the foregoing description. It is therefore not intended that this invention be limited except as indicated by the appended claims.

What is claimed is:

1. In a data communication system comprising a plurality of interconnected networks, a method for translating an Internet Protocol (IP) address to a network-specific local address useable for forwarding a packet over a local network the method comprising the steps of:

using a first node to contact a second node where both said first node and said second node are connected to said local network; thereafter establishing a communication link between said first node and said second node; thereafter transmitting from the first node to the second node over said communication link a self-registration message comprising an IP address of said first node and a network specific local address of said first node, said network specific local address being usable to forward a packet to said first node over said local network; and thereafter extracting, at said second node, said network specific local address and said IP address of said first node from said self-registration message; and storing in a memory device at said second node a record comprising said IP address of said first node and said network specific local address of said first node obtained in said extracting step.

2. The method of claim 1 wherein said network specific local address of said first node incorporates the geographic coordinates of said first node.

3. The method of claim 1, said method further comprising the steps of:

accepting at said second node said IP address of said first node as a translation input to provide an accepted IP address at said second node;

identifying said record at said second node using said accepted IP address; and extracting from said record identified in said identifying step said network specific local address of said first node as a translation output.

4. In a data communication system comprising a plurality of interconnected networks, a method for translating an Internet Protocol address to a network specific local address usable for forwarding a packet over a local network the method comprising the steps of:

using a first node to contact a second node where both said first node and second node are connected to said local network; thereafter establishing a communication link between said first node and said second node; thereafter transmitting a self-registration message from said first node to said second node over said communication link, said self-registration message comprising a network specific local address of said first node, said network specific local address being usable to forward a packet to said first node over said local network; thereafter extracting, at said second node, said network specific local address of said first node from said self-registration message;

assigning, at said second node, an IP address to said first node; thereafter storing in a memory device at said second node a record comprising said network specific local address of said first node and said IP address assigned to said first node; and transmitting from said second node to said first node over said communication link an assignment message comprising said IP address assigned to said second node.

5. The method of claim 4 wherein said network specific local address of said first node incorporates the geographic coordinates of said first node.

6. The method of claim 4, said method further comprising the steps of:

accepting at said second node said IP address of said first node as a translation input to provide an accepted IP address at said second node;

identifying said record at said second node using said accepted IP address; and consulting said record identified in said identifying step to obtain said network specific local address of said first node as a translation output.

7. In a data communication system comprising a plurality of interconnected networks, a method for forwarding a packet from a first node connected to an originating network to a second node connected to a destination network, said method comprising the steps of:

using the second node to contact a third node, said third node being connected to said destination network; thereafter establishing a communication link between said second node and said third node; thereafter transmitting from the second node to the third node over said communication link a self-registration message comprising an IP address of said second node and a network specific local address of said second node, said network specific local address being usable to forward a packet to said second node over said destination network; thereafter extracting, at said third node, said IP address and said network specific local address of said second node from said self-registration message;

storing in a memory device at said third node a record comprising said IP address of said second node and said network specific local address of said second node obtained in said extracting step;

inserting, at said first node, said IP address of said second node in a header of said packet; thereafter forwarding said packet from said first node to said third node using a method specified by the Internet Protocol;

extracting at said third node, said IP address from said packet; thereafter identifying said record at said third node using said IP address extracted from said packet;

consulting said record identified in said identifying step to obtain said network specific local address of said second node;

inserting at said third node said network specific local address of said second node obtained in said consulting step in a header of said packet; and thereafter forwarding said packet from said third node to said second node over said destination network.

8. The method of claim 7 wherein said network specific local address of said second node incorporates the geographic coordinates of said second node and the forwarding of said packet from said third node to said second node is accomplished by a geographic routing method.

9. In a data communication system comprising a plurality of interconnected networks, a method for transmitting a packet from a first node connected to an originating network to a second node connected to a destination network, the method comprising the steps of:

using said second node to contact a third node connected to said destination network; thereafter establishing a communication link between said third node and said second node; thereafter transmitting a message from said second node to said third node over said communication link, said message comprising a network specific local address of said second node, said network specific local address being usable to forward a packet to said second node over said destination network; thereafter assigning at said third node an IP address to said second node; thereafter storing in a memory device at said third node a record comprising said IP address assigned to said second node and said network specific local address of said second node;

transmitting from said third mode to said second node a message including said IP address assigned to said second node; thereafter inserting at said first node said IP address assigned to said second node in a header of said packet; thereafter forwarding said packet from said first node to said third node using the method specified by the Internet Protocol;

extracting, at said third node, said IP address of said second node from said packet; and thereafter identifying said record at said third node using said IP address extracted from said packet;

consulting said record identified in said identifying step to obtain said network specific local address of said second node;

inserting at said third node said network specific local address of said second node obtained in said consulting step in a header of said packet; and thereafter forwarding said packet from said third node to said second node over said destination network.

10. The method of claim 9 wherein said network specific local address of said second node incorporates the geographic coordinates of said second node and the forwarding of said packet from said third node to said second node is accomplished according to a geographic routing method.

11. In a data communication system comprising a plurality of interconnected networks, a method for translating an Internet Protocol (IP) address to a network specific local address usable for forwarding a packet over a local network the method comprising the steps of:

storing in a memory device at a first node a record comprising an IP address of a second node connected to said local network and a network specific local address of said second node usable for forwarding a packet over said local network to said second node, wherein said first node is inaccessible via said local network and accessible via said plurality of interconnected networks; thereafter accepting, at a third node, said IP address of said second node as a translation input;

formulating an inquiry message at said third node connected to said local network and to said plurality of interconnected networks, said inquiry message comprising said IP address of said second node;

forwarding said inquiry message from said third node to said first node over said plurality of interconnected networks;

extracting at said first node said IP address of said second node from said inquiry message;

identifying said record at said first node using said IP address extracted from said inquiry message;

consulting, at said first node, said record identified in said identifying step, to obtain said network specific local address of said second node;

formulating a reply message at said first node, said reply message comprising said network specific local address of said second node obtained in said consulting step;

forwarding said reply message over said internet to said third node; and extracting at said third node said network specific local address of said second node from said reply message.

12. The method of claim 11 wherein said network specific local address includes the geographic coordinates of said second node.

13. In a data communication system comprising a plurality of interconnected networks, a method for forwarding a packet from a first node connected to an originating network to a second node connected to a destination network, the method comprising the steps of:

storing, in a memory device at a third node, a record comprising an IP address for said second node and a network-specific local address for said second node for forwarding packets over said destination network to said second node, said third node being disconnected from said local network and accessible via an internet; thereafter inserting at said first node said IP address of said second node in a header of said packet; thereafter forwarding said packet from said first node to a fourth node connected to said destination network using the method specified by the Internet Protocol; thereafter extracting at said fourth node said IP address of said second node from said packet; thereafter formulating an inquiry message at said fourth node, said inquiry message comprising said IP address of said second node extracted from said packet;

forwarding said inquiry message from said fourth node to said third node over said internet;

extracting at said third node said IP address of said second node from said inquiry message; thereafter identifying said record at said third node using said IP address extracted from said inquiry message;

consulting, at said first node, said record identified in said identifying step to obtain said network specific local address of said second node;

formulating a reply message at said third node, said reply message comprising said network specific local address of said second node obtained in said consulting step;

forwarding said reply message to said fourth node over said internet;

extracting at said fourth node said network specific local address from said reply message;

inserting at said fourth node said network specific local address of said second node extracted from said reply message in a header of said packet; and thereafter forwarding said packet from said fourth node to said second node over said destination network.

14. The method of claim 13 wherein said network specific local address incorporates the geographic coordinates of said second node and the forwarding of said packet from said fourth node to said second node is accomplished according to a geographic routing method.

* * * * *